United States Patent

Thomas et al.

[11] Patent Number: 6,075,594
[45] Date of Patent: Jun. 13, 2000

[54] SYSTEM AND METHOD FOR SPECTROSCOPIC PRODUCT RECOGNITION AND IDENTIFICATION

[75] Inventors: Gordon A. Thomas, Princeton; Mark H. Hansen, Hoboken; Don X. Sun, Warren, all of N.J.

[73] Assignee: NCR Corporation, Dayton, Ohio

[21] Appl. No.: 08/893,343

[22] Filed: Jul. 16, 1997

[51] Int. Cl.$^7$ ........................................ G01J 3/28
[52] U.S. Cl. ........................................ 356/328
[58] Field of Search .................. 356/328, 326, 356/430, 428, 446, 240, 416, 419, 402–411, 134–136; 702/28, 84; 250/576, 226; 186/61; 209/580, 587, 583, 584; 364/148.02, 148.06, 468.23, 478.03, 479.06–479.08; 235/383, 462, 462.01–462.05

[56] References Cited

U.S. PATENT DOCUMENTS

| | | |
|---|---|---|
| Re. 29,031 | 11/1976 | Irving et al. . |
| 4,687,107 | 8/1987 | Brown et al. . |
| 4,964,053 | 10/1990 | Humble . |
| 5,083,638 | 1/1992 | Schneider . |
| 5,085,325 | 2/1992 | Jones et al. . |
| 5,221,959 | 6/1993 | Ohyama et al. . |
| 5,339,963 | 8/1994 | Tao . |
| 5,426,282 | 6/1995 | Humble . |
| 5,867,265 | 2/1999 | Thomas . |

*Primary Examiner*—K. P. Hantis
*Attorney, Agent, or Firm*—Crummy, Del Deo, Dolan, Griffinger & Vecchione; Peter H. Priest

[57] ABSTRACT

A system and method for optically identifying a product from a reference library of known products based on a reflected spectrum of the product. A broad wavelength light source illuminates the product and a spectrometer receives and forms a plurality of finely spaced wavelengths from the reflected spectrum. A detector optically processes the wavelengths to generate signals proportional to an amount of light received at each of the wavelengths. The signals are normalized and pre-processed to form data sets which relates each of the signals to each of the finely spaced wavelengths. This is performed for all of the different products and compiled. A set of basis functions is then generated for all of the different products and a corresponding set of basis coefficients is generated for each of the different products. This information, along with an electronic label for each product, is stored to form the reference library. When identifying an unknown product, the system generates a set of basis coefficients for the product to be identified. This latter set is statistically compared against the reference library to identify the corresponding set of basis coefficients most closely matching the unknown set of basis coefficients.

30 Claims, 4 Drawing Sheets

SYSTEM AND METHOD FOR SPECTROSCOPIC PRODUCT RECOGNITION AND IDENTIFICATION

RELATED APPLICATIONS

The present patent application is related to U.S. patent application Ser. No. 08/511,987 now U.S. Pat. No. 5,867,265, entitled, Apparatus and Method For Spectroscopic Product Recognition and Identification, and having a filing date of Aug. 7, 1995, and having a common assignee and being incorporated herein by reference.

1. Field of the Invention

The present invention relates to the field of optical product identification, and more particularly to the use of mathematical classification techniques in combination with optical spectroscopy to identify products and materials.

2. Background of the Invention

Bar-code readers are used extensively in the retail grocery industry at checkout stations to identify tagged items affixed with bar-code tags. An item is identified by means of its bar-code using a data base stored in a host computer. Typically, a description of the item and its price are printed on a grocery receipt and an ongoing price total is kept as additional items are scanned. The use of bar-code readers has generally been well received by the public, due in part, to the reliability and reduced time spent in the checkout line. However, a reliable system is needed to identify items for which it is undesirable to attach bar-code labels, for example, fresh produce, such as fruits and vegetables.

Optical characterization of fresh produce has been explored to some extent in the prior art. Some general considerations involved in the optical identification of these products are discussed in a number of publications, including for example, "Postharvest Handling: A Systems Approach", by R. L. Shewfelt and S. E. Prussia (Academic Press, New York). An example of a particular application of produce recognition is a study by L. Bochereau et al. (J. Agric. Eng. Res. (1992) Vol. 51, 207–216) showing that near infrared spectra can be used to determine the quality of golden delicious apples, provided that a careful neural-network analysis is performed in the wavelength range from 1,000 to 1,500 nm. This study being applicable to a single variety of apples.

A number of devices are disclosed in the prior art for use in characterizing products using their optical properties. For example, Japanese patent number 03-160344 to Kenichi Yoneda and assigned to Mitsubishi Heavy Industries, Ltd. discloses a device intended to measure the ingredients of fruits. The device shines near-infrared light onto a piece of fruit, and collects the reflected light with an optical fiber. The light is dispersed with a grating and directed into an array of photo detectors. The electronic signal produced is then normalized to a reference signal and the resulting spectrum is then used to characterize the sweetness of the fruit, using the near-infrared region of the spectrum only.

Another set of devices utilize color-vision to differentiate or sort the products. The disadvantage of these devices are that they use at most three colors to determine the effective color of the product. The devices rely on either the red, blue and green color signals to determine the color of the product or on single measurements from distinct, narrow wavelengths. A drawback of these devices are that they do not use the spectra of the test objects to optimize the method of analysis.

Accordingly there is a need to provide an optical identification system for recognizing fresh produce and other products, which results in reliable identifications and is cost efficient. Moreover, an optical identification system is needed which is easily integratable with bar code scanners used in the supermarket industry.

SUMMARY OF THE INVENTION

The present invention teaches a system and method which increases the accuracy and reliability of product identification by analyzing color information over a broad wavelength spectrum. The system provides optical recognition of products that do not readily lend themselves to standard labeling techniques. Importantly, the system can be employed with, and is integratable with, retail checkout systems which use bar code reader technology. The resulting combination provides a system which processes both labeled and non-labeled products reliably and accurately.

In an exemplary embodiment of the present invention, a spectrum of an unknown product is compared with a library of known spectra, where the information stored consists of a single set of basis functions representing all products to be identified and a corresponding set of basis coefficients for each different type of product. For each sample taken, the method of the present invention normalizes the received data, compiles an intensity versus wavelength matrix, and performs spatial and wavelength reduction on the data. If the sample is for the generation of the library of spectra, a dimension reduction analysis is performed and the basis functions and basis coefficients are calculated. If the sample is for an unknown product, then the dimension reduction analysis and the basis functions are applied to the data to generate a set of basis coefficients. This latter set is then statistically compared with a library of spectra to identify the product or at least designate the closest known products. The present invention method decreases the amount of computer memory required and increases the efficiency, accuracy and reliability of the product identification system.

Advantageously, the method of present invention utilizes color intensity information from a wide range of wavelengths as compared to prior art devices which use narrow wavelengths or specific colors. In conjunction with the data reduction and utilization of the basis functions, the present invention permits greater accuracy in product identification without a corresponding increase in processing time. Importantly, the present invention has to maintain only a fraction of the original data to make the required identification.

The above factors make the present invention product identifier an advantageous and practical solution for use at supermarket checkout counters to identify fresh produce, such as fruits and vegetables, which are not readily identifiable with a bar-code label. Moreover, the product to be identified could be sitting on a scale and its weight could be measured during the identification process. In a similar manner to grocery items containing bar-code labels, the name and price of the item would be printed on a grocery receipt using the item identification, along with the weight and the price per pound which had been previously stored.

BRIEF DESCRIPTION OF THE FIGURES

For a better understanding of the present invention, reference may be had to the following description of exemplary embodiments thereof, considered in conjunction with the accompanying drawings, in which.

DETAILED DESCRIPTION OF THE DRAWINGS

For clarity of explanation, the illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example the functions of processors presented in FIGS. 3–4 may be provided by a single shared processor. (Use of the term "processor" should not be construed to refer exclusively to hardware capable of executing software.)

Illustrative embodiments may comprise microprocessor and/or digital signal processor ("DSP") hardware, read-only memory ("ROM") for storing software performing the operations discussed below, and random access memory ("RAM") for storing results. Very large scale integration ("VLSI") hardware embodiments, as well as custom VLSI circuitry in combination with a general purpose DSP circuit, may also be provided.

Figure 1:
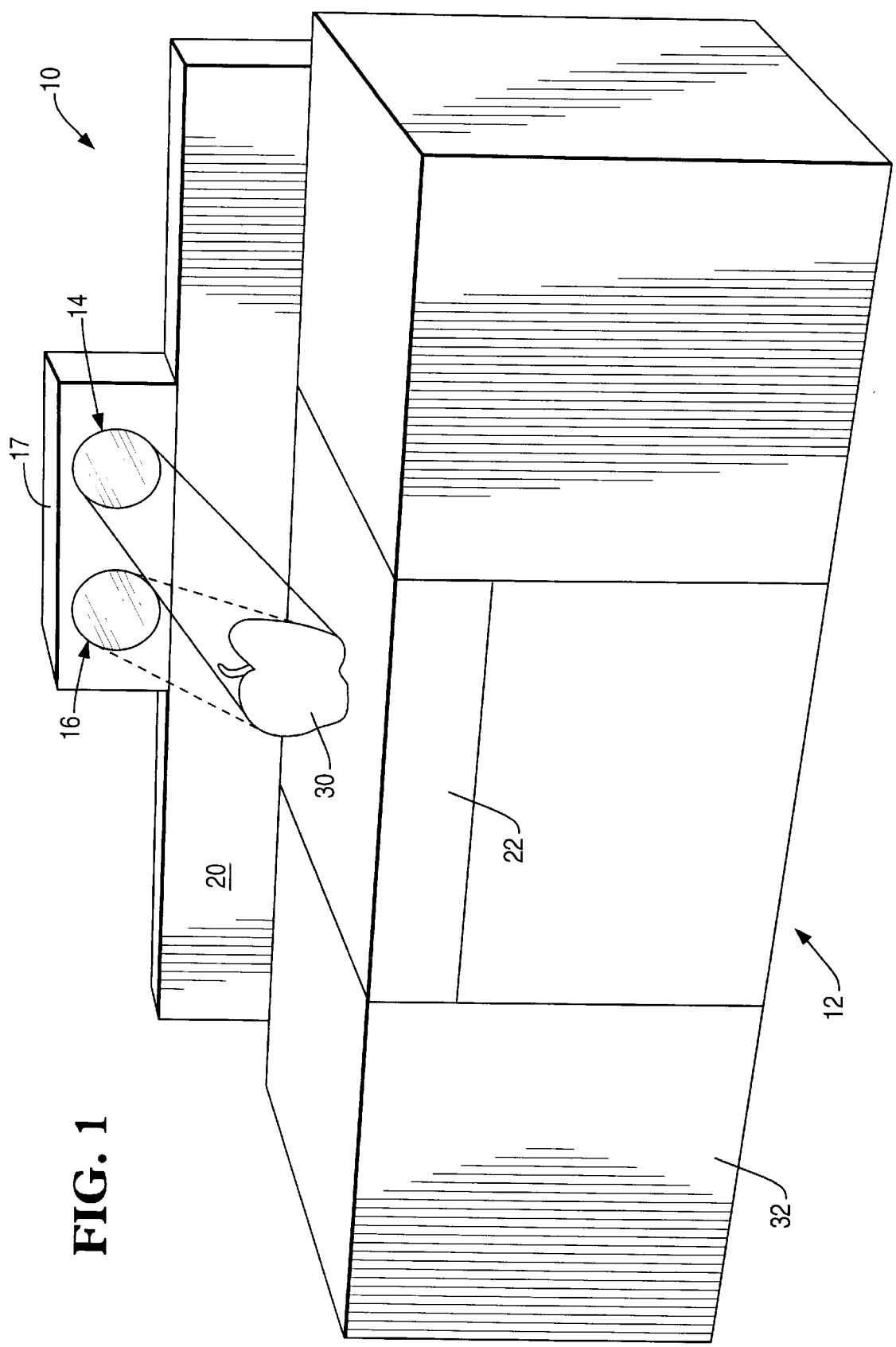
FIG. 1 shows one preferred embodiment of the present invention optical identification system as used in a supermarket checkout.

Referring to FIG. 1, there is shown an exemplary embodiment of an optical product recognition system 10 which utilizes the methods of the present invention to identify products utilizing spectroscopic technology. The recognition system 10, as shown, is situated at a checkout station 12 of a supermarket and includes a light source 14 and a light gathering window 16 mounted within a housing 17. The checkout station 12 includes a bar code reader 20 and scale 22, each of which is known in the art, and each of which is electrically coupled to a processor having operator controls which may, for example, be part of an existing cash register (not shown). The bar-code reader 20 and scale 22 transmit electronic data to the processor where it is subsequently processed. As explained below, the recognition system 10 may also be coupled to the processor. It will also be understood that the processor need not necessarily be included within the cash register and that the processor may be a remote device.

As is known, grocery products having bar-coded labels may be scanned at a bar-code reader to identify the product. In most cases, a description of the recognized item and its previously stored price are displayed, printed and automatically tabulated as part of a customer's grocery bill. In the case of grocery items which do not lend themselves to bar-code labeling, such as fresh produce, an alternative methodology is needed to automatically identify an item or items and record the price. As shown in FIG. 1, an item of fresh produce 30 (an apple) is situated on the scale 22 of the checkout counter 32 and is exposed to light having a broad wavelength spectrum which emanates from the light source 14. An example of a suitable light source for producing a broad wavelength spectrum is a tungsten-halogen lamp which produces a useful spectral range including part of the infrared, all of the visible and part of the ultra-violet range.

Figure 2:
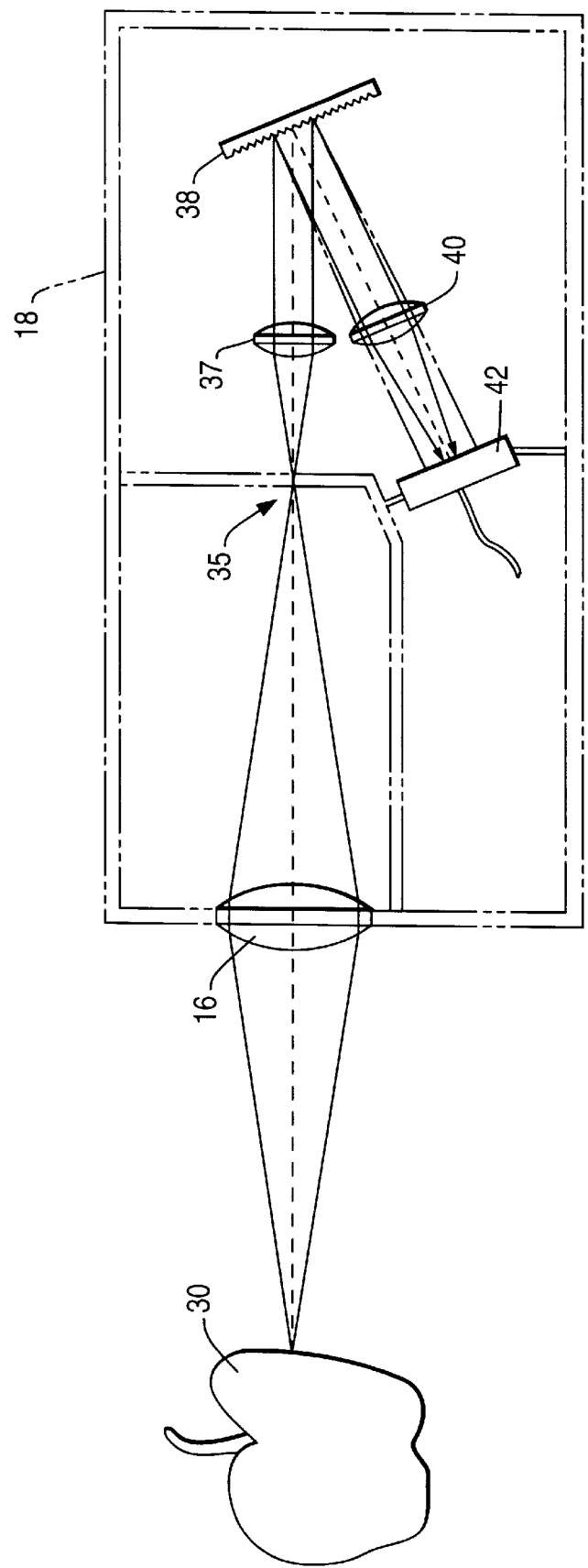
FIG. 2 shows one preferred embodiment of the optical transmission path within a spectrometer of the optical identification system.

Referring to FIG. 2, it can be seen that light is reflected from the produce 30 and received at the light gathering window 16. In an exemplary embodiment, window 16 is a 2" diameter window and the light forms a strip of width approximately ⅛. A suitable optical component which forms the window 16 (comprised, for example, of one or more lenses) gathers the light that is reflected from the produce 30. This light is directed through a slit 35 into a spectrometer 18 contained within the system housing 17. The spectrometer collimates the light with an optical element 37, and disperses the light into a plurality of finely spaced wavelengths using a dispersing element 38, such as one or more gratings, prisms or a combinations of both. It will be understood that a large number of wavelengths are spatially separated by the dispersion of light wherein the number of wavelengths which are resolved may range, for example, between 100 and 1100 wavelength bands. The dispersed light is transmitted through an optical focusing element 40 onto an array of photo detectors 42. The array of detectors 42 may be comprised, for example, of a linear diode array or a 512×512 element charge-coupled device (CCD) array which indicates the amount of light at each detector. The combination of these elements indicates the amount of light at each of a finely-spaced set of wavelengths. The detectors are chosen to be sensitive over a large wavelength region. For example, Si detectors are useable from the ultra violet to the near-infrared spectra region, i.e. from 250 nm to 1100 nm.

The Si detector devices used with the present invention are well known in the art, and it is intended that off-the-shelf detector components be used, so as to effectively minimize production costs. Other types of detecting elements may also be utilized, for example, photo-diodes made from gallium arsenide and like materials. The spectrometer component 18 of the present invention recognition system 10 utilizes a large number of detectors, typically in a range between 50 and 1100, in order that the light may be recorded at many wavelengths very rapidly and sensitively over a wide range of wavelengths. This is a significant improvement over the prior art in that a wider range of wavelengths allows a more precise identification of the product, and the more finely spaced intervals enable the spectrum to be determined in greater detail. The detector array produces a set of analog signals which are read with suitable electronics such as an analog to digital converter and transferred to a processor in the form of a spectrum.

Figure 3:
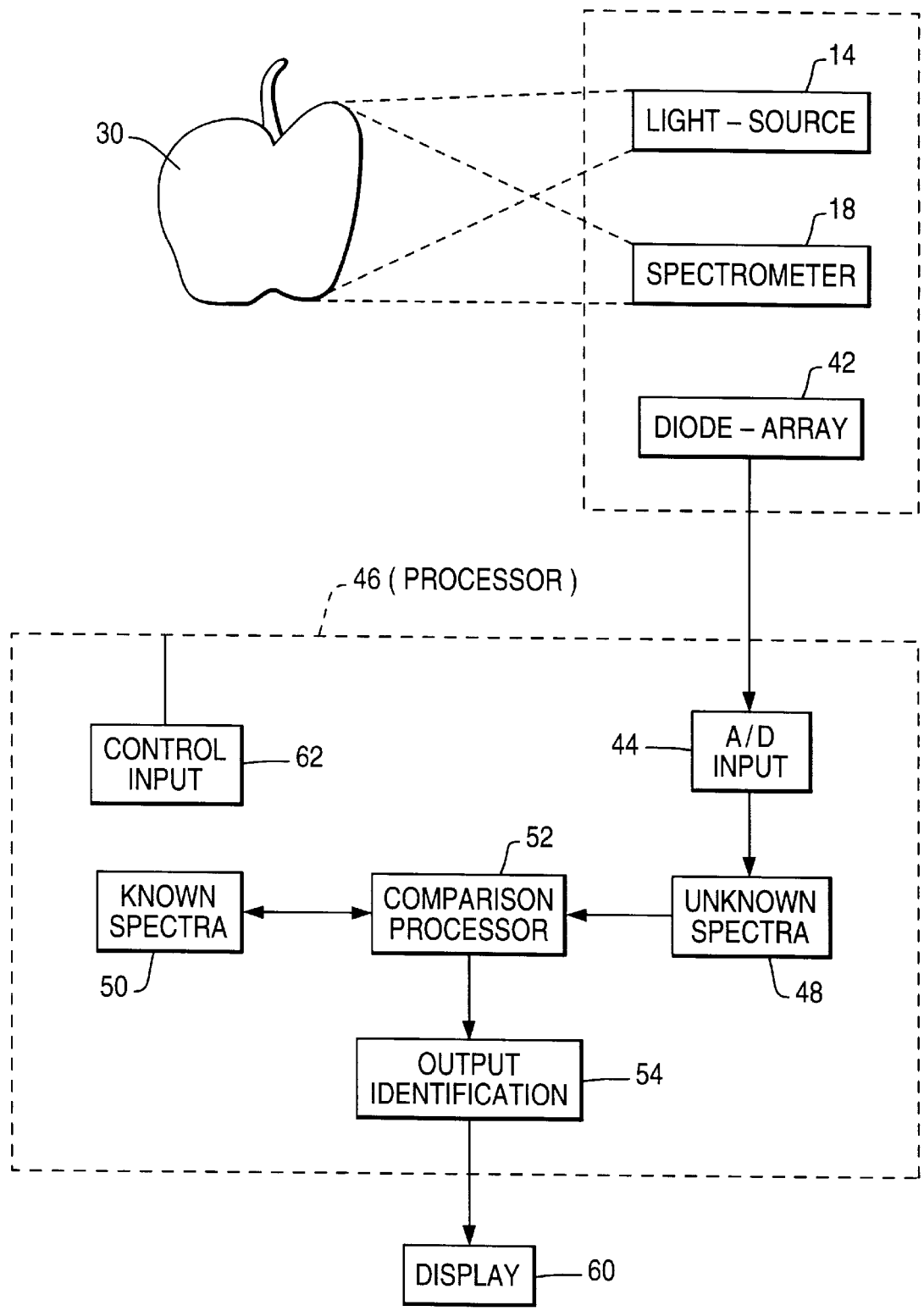
FIG. 3 shows a block diagram for one preferred embodiment of the present invention optical identification system.

FIG. 3 shows a block diagram of the present invention optical illumination and detection system 10. For purposes of clarity, a top level functional overview of what takes place within processor 46 for identifying an unknown product is presented first, followed by a more detailed explanation of the present invention methodology. As can be seen, the light source 14 outputs a beam of light onto the product to be identified 30 where the light from the source is reflected back and received at the spectrometer 18 which disperses the light into an optical spectrum. As described in FIG. 2, the light from the dispersing element 38 is directed towards an array 42 made up of a large number of detecting elements and which is part of the spectrometer 18. The analog signals from the array are transferred to an analog-to-digital converter 44 and then transferred to the processor 46 in the form of an electronic representation of the unknown spectrum 48. It will be understood that the A/D converter 44 may be included as part of the processor 46 as shown in FIG. 3 or as part of a circuit board for handling signals at the diode array 42.

The unknown spectrum 48 sent to processor 46 consists essentially of a set of pairs of values, i.e., each pair consisting of a first value representing how much signal is produced and a second value representing what specific detecting device and thus what wavelength produced the signal. A data array that is a set of these values is then representative of the spectrum. Sets of known spectra from like identifiable products determine sets of reference spectra 50, and the unknown spectrum 48 is compared with the reference sets 50 using comparison processor 52. As shown below, the sets of reference spectra 50 are created from the same type of optical and electronic input to processor 46, but from known products. Processor 46 utilizes the methods of the present invention to normalize all spectra from the reference and unknown products to ensure accuracy and consistency in identifying the unknown product. For reference set 50, an operator uses processor 46 to provide an electronic label such as "Macintosh Apple" and a price per unit weight to a set of electronic spectra from the known product. The operator then uses processor 46 to group and characterize individual spectra from the known product into reference set 50.

The system may also be calibrated using recognition system 10 with a calibration lamp (not shown) that emits light of known wavelengths, such as an Argon gas lamp, in order that a specific position of a detector element can be assigned to a particular wavelength of light on that element. As explained below, this permits different spectrometers to use the same set of known spectra 50.

In the present invention system, comparison processor 52 compares the unknown spectrum 48 with reference spectra sets 50 utilizing statistical techniques. Comparison processor 52 takes into account how much the known spectra for a single item vary from one another in addition to storing the average spectrum. In an embodiment of this invention where a CCD array is used as the photo detector, a set of test spectra is obtained from different physical locations on the product, for example, from top to bottom of a piece of fruit, thus including texture. Processor 52 then computes the most likely match for the single unknown spectrum or the set of unknown spectra and also calculates an indicator of the closeness of the match, e.g., a "distance" in a mathematical color space or a probability value. Processor 52 may also provide the next most likely possible matches and their probabilities. As can be seen, processor 46 may be coupled to a display device 60, which is in turn coupled to an input device/control input 62, such as a touch screen or keyboard for making operator selections. It will be understood that the display and input device may also be part of an existing cash register/checkout system, or alternatively that the system may be automated.

Once the matches have been computed, a display 60 (for example, a monitor or a display on the existing cash register) reads out a list of possible matches in rank order that have a probability of match greater than a predetermined threshold, for example, greater than 80% probability. An operator may check that the first listed item is correct and either accept the first choice or indicate the correct choice using the input device 62. As an alternative, the system could immediately accept the first choice, as in a fully automatic (unmanned) checkout system with a conveyor belt. As mentioned with respect to FIG. 1, in a preferred implementation of the system, the product to be identified would be sitting on a scale 22 and its weight would also be measured as part of the identification process. The scale 22 and optical identification system 10 are coupled to the processor (as is the bar code reader 20) in order to transfer electrical data for processing. As soon as the item identification 54 is made for the produce item in question, a total price for the identified item(s) can be computed using the weight and a previously stored price/unit figure. In a similar manner, then, to grocery items containing bar-code labels, the name and price of the produce item just identified could be printed on a grocery receipt using the item description, the weight, and the price per pound which was previously stored in the database.

Figure 4:
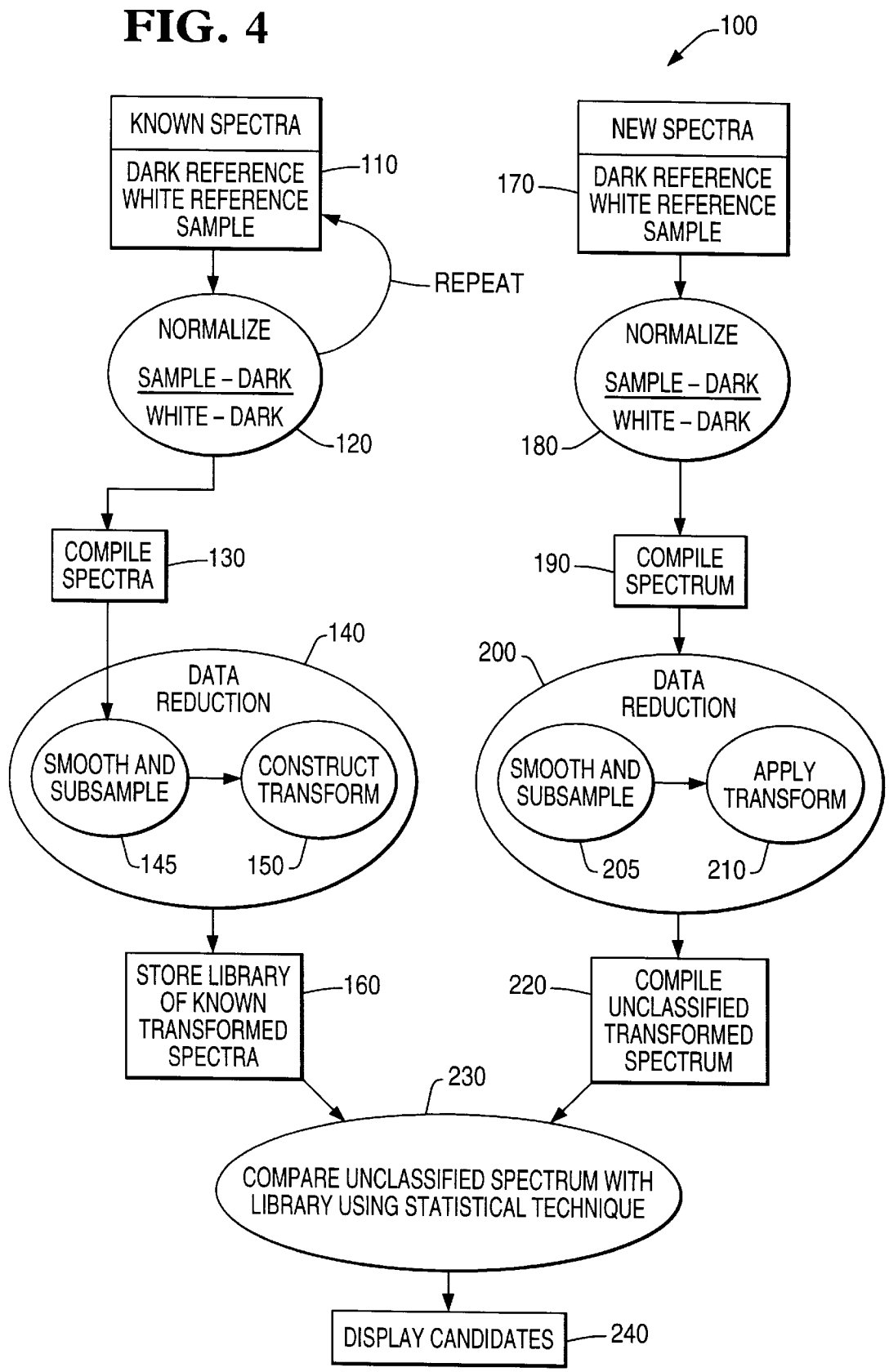
FIG. 4 is a functional flowchart of the methodology of the present invention.

Referring now to FIG. 4, there is presented a more detailed flowchart 100 of the methodology of the present invention. As stated above, a spectrum (in the form of signals) of an unknown product is compared against a library of known spectra. Construction of the library is therefore initially explained, followed by how the unknown spectrum is identified using the library in conjunction with the statistical comparison techniques.

Accurate and reliable identification and verification is increased by proper normalization of the spectra of the reference products and of the unknown product. The methodology of the present invention achieves this by measuring the "dark current" of the apparatus in recognition system 10 (step 110). This is a reference measurement related to the properties of the apparatus and can be measured by shutting off the light or by attaching a black strip of cloth or other similar types of material on the window. The method then measures the spectrum of a known (flat) white reference substance for calibration purposes (step 110). A measurement is then made of a sample of the product (step 110). Note, that this sample could represent one of many samples per category of product. The spectra of the sample is then normalized using the dark and white reference measurements as shown below (step 120):

$$\frac{sample - dark}{white - dark} \rightarrow Intensity_{sample}$$

This provides a normalized intensity value for each sample at each data element or pixel. By using the calibration techniques explained above, each pixel number can be converted into a wavelength, i.e., $f(N) \rightarrow \lambda$, where N is the number of pixels across a row. By taking spectra measurements of multiple samples in a category, the present method obtains a series of intensity values (I) for each $\lambda$ in a given category, thereby achieving a more comprehensive library for each category. The process would then be repeated for every product category to generate the reference library (step 130). Note that the reference measurements are repeated until the apparatus is stable or provides consistent readings. New reference measurements would be taken if the apparatus or environment was changed with respect to the previous measurements.

Once the spectra have been measured and compiled for all product categories, a reduced data set is produced from which the basis functions and basis coefficients are generated (step 140). Data averaging is necessary in view of the fact that for each sample taken there is a corresponding 512×512 matrix of information received for processing. The method of the present invention smoothes and subsamples the data by performing a spatial reduction and a wavelength reduction on the compiled spectra (step 145). Spatial reduction reduces the compiled spectra by averaging the data available from a given number of rows, where the first row may represent an upper spot on the product and last row may represent a lower spot on the product. The range of positions correspond to the extent of the strip of light that goes through window 16. The number of rows to be averaged is a trade-off between data processing, speed and accuracy. In one embodiment of the present invention, the number of rows of data is reduced to 72 from 512 by averaging. In an exemplary embodiment of the present method, all of the information could be averaged and reduced to one row of information. By averaging the data from different rows, the reduced data set has less noise, requires less memory to store the data and increases processing speed. If the item has a uniform color, the averaging has no detrimental effect on the accuracy of the identification process. Wavelength reduction is similar to spatial reduction, but in this case the averaging of the spectra is done across a given row, where a rightmost pixel represents a blue wavelength and the leftmost pixel represents a red wavelength. In an exemplary case, the range of wavelengths is 350 nm to 725 nm. In one embodiment of the present invention, the data is reduced down to some number, N, of pixels of information or wavelengths, where N=90.

The method of the present invention then derives a set of basis functions from the averaged data set, where intensity is plotted versus wavelength. The number of basis functions generated is based on the desired accuracy of classification. Importantly, once the set of basis functions has been generated, it is the same for all categories of products. Corresponding to the set of basis functions is a set of basis coefficients, where a particular set of basis coefficients together with the basis functions represent one sample. This means that instead of having to store a 512×512 matrix of information for each sample, the present invention needs to store a given number of basis functions for all product categories and a corresponding set of basis coefficients for each measured sample. This greatly reduces the memory requirements of recognition system 10 without decreasing accuracy in identification. The number of basis functions to be extracted from the data depends upon how many are required to give good classifications of unknown objects without affecting the processing speed (i.e., a large set of basis functions is not desired). The number of basis functions could be as large as N, the number of retained wavelengths (for example, 90), which represents a perfect description of the data set. This is too large a set and in actuality is not required to give a high level of accuracy of classification. The accuracy is found to initially increase with the number of basis sets, and to saturate between 10 and 20. However, at least four sets are required to attain a reasonable level of accuracy. If ten to twenty sets are used, then the accuracy level is acceptable as well as the number of sets being less cumbersome to process. Note that if more than twenty sets are used, then the accuracy is slightly worse due to noise. In an exemplary embodiment of the present invention, the number of basis functions which describes the data set with an acceptable level of accuracy is sixteen.

The basis functions and coefficients can be generated using a number of dimension reduction techniques. One method for generating the basis functions and coefficients is to use Fisher's linear discriminant analysis ("LDA"), which finds a low dimensional projection of the data such that in the resulting space, the ratio of between-category variation and within-category variation is the largest. For purposes of clarity, a description of the LDA procedure is presented in Appendix A. In an exemplary embodiment of the present method, another approach termed penalized discriminant analysis ("PDA") is utilized for dimension reduction. This approach is particularly useful when the predictor variables, as in the color spectrum case, are highly correlated. By imposing a smoothness constraint on the discriminant basis coefficients, the PDA technique results in improved prediction performance and interpretability. Again, for purposes of clarity, a description of the method is provided in Appendix B. In the color spectrum case, the predictor variables represent the intensity at different wavelengths. Adjacent predictor variables would therefore be more alike than the ones that are far apart. Since the predictor variables are highly correlated, it is desirable to have smooth basis functions as functions of wavelength for neighboring predictor variables. As a consequence, utilizing PDA for dimension reduction improves accuracy slightly in classifying an unknown product.

The above represents the methodology utilized in constructing the reference library. As shown, the reference library stores one set of basis functions for all of the products to be identified, a corresponding set of basis coefficients for each sample in each category, and a label for each category (step 160 in FIG. 4).

Referring still to FIG. 4, the process of how an unknown product is identified is now described. The process of making and normalizing the data is similar to that described above for the reference library. As stated previously, reference measurements can be taken if the apparatus or the environment within which the apparatus is operating has changed and could result in unreliable results (step 170). The spectra of the unknown product is then taken and normalized using dark and white reference measurements (step 180). The intensity versus wavelength spectrum is then compiled for the unknown product (step 190). Spatial and wavelength reduction is then performed on the normalized data (step 205) and a set of basis coefficients is generated by fitting to the same basis functions determined in making the library (step 210).

The unclassified set of basis coefficients is stored (step 220) and compared against the reference library (step 160) using one of several statistical classification techniques (step 230). The dimension reduction techniques discussed above are intended to make the job of classifying an unknown spectra more efficient by designing a reduced space in which J categories are separated as much as possible. Traditional LDA is derived from the assumption that samples from each category follow a multivariate normal distribution. In the color spectrum case, the optimal classification rule would assign to an unknown spectra the label of the nearest (in the standard Euclidian norm) category centroid in the reduced space. Analysis and experimentation has shown that other assignment/classification rules result in lower error rates, which may result because the normality assumption in the color spectrum case is unrealistic. Two classifying procedures: the nearest neighbor rule and the non-negative least squares methods are discussed below. Other statistical approaches can also be used to classify the unknown spectra.

First, the nearest neighbor rule is discussed. If LDA is utilized to achieve dimension reduction, the simplest classification rule assigns to an unknown spectrum x the label of the spectrum in the training data $(x_{ij})$, i=1, 2, ... $n_j$, j=1, 2, ..., J, closest to x (where distance is measured in the standard Euclidian norm) in the reduced space. Typically, the K nearest neighbors to a sample x are used in determining category membership, in which case a label can be assigned to x by a majority vote, i.e., the class most prevalent among the nearest neighbors. In an exemplary case, K is chosen between 5 and 10.

An alternative classification method is the non-negative least squares approach. When determining the distance between a class j and a new spectrum x based on training data $(x_{ij})$, i=1, ..., $n_j$, the question being asked is whether or not the unknown spectra shares any of the features exhibited by the reference library members. In this way, the training data can be viewed as a set of templates against which we would like to see how well we can match the unknown spectra. That is, the approach attempts to find weights $\beta, \ldots, \beta_{n_j} \geq 0$ minimizing the distance:

$$\|x-(\beta_1 x_{1j}+\ldots+\beta_{n_j} x_{n_j j})\|^2$$

In an abstract sense, the distance between x and category j can be thought of as the minimized value of the above expression. The non-negativity constraints are important since there is no interest in cancellations between the patterns. Suppose, for example, that $n_j >> N$, the number of retained wavelengths, e.g., 90. Then it might be possible to exactly reproduce x from the training data for category j, even if x had very little in common with these templates.

The optimization problem given above can be solved in a variety of ways. If an unrestricted regression of x on the patterns for class j has no negative coefficients, then the analysis is finished. On the other hand, if there are a number of negative coefficients, then our solution must be on a boundary of the coefficient space, meaning that one or more of the $\beta_j$ must be zero. In this way, it can be seen that an "all subsets" regression procedure can be used to solve the problem. That is, the solution is an unrestricted least squares fit onto that subset of the variables satisfying the non-negativity constraints and having the minimum residual sum of squares.

Analysis has shown that while this approach has intuitive appeal for the full data (N dimensional spectra), the performance of this technique for calculating distances in a nearest neighbor rule is better if applied to the reduced spaced derived from the LDA approach. Other procedures have been developed for dimension reduction in this context, including the archetypal analysis of Cutler and Breiman (1994). In this case, although the number of templates for each category is reduced, the analysis is still done in the original N dimensional space. New templates, or archetypes, are found that are mixtures or non-negative combinations of the original training data for a given category. Consider just category j (dropping the category subscripts). For fixed archetypes $z_1, \ldots, z_k$, where:

$$z_k = \beta_{k1} + \ldots + \beta_{kn} x_n \quad \text{for } k=1, \ldots, K,$$

and $\beta_{ki} \geq 0, \Sigma_i \beta_{ki} = 1$, and define the coefficients $\alpha_{ik}$ as minimizes of $$\|x_i - (\alpha_{i1} z_1 + \ldots + \alpha_{iK} z_{1K})\|^2,$$

again subject to the constraints that $\alpha_{ik} \geq 0$, $\Sigma_k \alpha_{ik} = 1$. Finally, define the archetypal patterns as the mixtures $z_1 \ldots z_K$ that minimize $$\sum_i \|x_i - (\alpha_{i1} z_1 + \ldots + \alpha_{iK} z_{1K})\|^2.$$

By selecting the number of archetypes K<<n, the dimensionality of the classification procedures can be reduced.

The comparison results are then displayed to the user of the optical identification system. As stated previously, the display can show a ranked order list of possible matches that have a probability of match greater than a predetermined threshold, for example, greater than 80% probability. A cashier could check that the first listed item is correct and either accept the first choice or indicate the correct choice using a supplied input device. The cashier could also indicate to the system to repeat the identification process. Alternatively, the system could immediately accept the first choice, as in a fully automatic (unmanned) check-out system.

Although the above analysis is illustrated for color identification, the same approach can be taken for shape. In this instance, the data reduction process would be modified to emphasize the shape characteristic. The outcome of the comparison analysis would then be used to potentially re-order the outcome of the color identification process. This could be done on a weighted or non-weighted basis, depending upon the relative accuracies of both the color and shape identification processes.

In another embodiment of the present invention, the outcome of the classification process could be combined with video images of the product. These images present a profile of the product and can be mathematically/statistically combined with the above classification outcomes to generate a ranked order of choices. The profile could be a rectangular image of the product indicating the top and bottom of the product. Once the size of the rectangular image is determined, it can be combined with the color analysis to classify products at error rates less than that of classifying by color analysis alone.

The present invention optical identification system may be implemented to identify any item of commerce from which the optical reflectance can be measured. This method will be particularly valuable for items that are not economical to label with bar-codes. Examples of such articles include anything from fruit, produce, lumber to loose clothing and fabrics and include meat, where the fat content can be measured as well. All that is necessary to accomplish the identification is a set of sufficiently distinct reference spectra with which a test spectrum can be readily compared.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

APPENDIX A

Linear Discriminant Analysis

Let d-dimensional vector $(x_{ij})_{d \times 1}$ represent the observation vector of the i-th sample from the j-th class, for $j=1, \ldots, J$ and $i=1, \ldots, n_j$ where J is the number of classes.

When d is large, such as d=N in the color spectrum example, many statistical procedures become impractical due to the lack of "sufficient" data that represent the population of patterns in high dimensional space. Therefore, it is desirable to reduce the dimensionality of the original data before carrying out classification procedures.

A widely used method of dimension reduction is the Fisher's linear discriminant analysis ("LDA"), which seeks lower dimensional projections that separate different classes the most. In the following, a brief description is given of LDA and the computational procedure. Let $$\bar{x}... = \frac{1}{n} \sum_{j=1}^{J} \sum_{i=1}^{n_j} x_{ij} \text{ and } \bar{x}_{j.} = \frac{1}{n_j} \sum_{i=1}^{n_j} x_{ji}$$

be the overall mean and the mean of j-th class, where $n = \Sigma^J_{j=1} n_j$. The total sample covariance matrix would be:

$$S_{T(d \times d)} = \frac{1}{n} \sum_{j=1}^{J} \sum_{i=1}^{n_j} (\bar{x}_{ji} - \bar{x}...)(\bar{x}_{ji} - \bar{x}...)^T$$

and can be decomposed into between-class sample covariance and within-class sample covariance as follows:

$$S_{T(d\times d)} = S_{B(d\times d)} + S_{W(d\times d)} \frac{1}{n}\sum_{j=1}^{J} n_j(\overline{x}_{j.} - \overline{x}...)(\overline{x}_{j.} - \overline{x}...)^T +$$

$$\frac{1}{n}\sum_{j=1}^{J}\sum_{i=1}^{n_j}(x_{ji} - \overline{x}_{j^*})(x_{ji} - \overline{x}_{j^*})^T$$

Suppose that we want to find projections of the original d-dimensional data x to p-dimensional space, (p is usually much smaller than d), we use $$(y_{ij})_{p\times 1} = F_{p\times d}^T (x_{ij})_{d\times 1}$$

then, the between-class sample covariance and within-class covariance of y are:

$$S_{B(p\times p)}^y = \frac{1}{n}\sum_{j=1}^{J} n_j(\overline{y}_{j^*} - \overline{y}...)(\overline{y}_{j^*} - \overline{y}...)^T$$

$$S_{B(p\times p)}^y = \frac{1}{n}\sum_{j=1}^{J} n_j(F^T\overline{x}_{j^*} - F^T\overline{x}...)(F^T\overline{x}_{j^*} - F^T\overline{x}...)^T$$

$$S_{B(p\times p)}^y = F^T S_B F$$

$$S_{W(p\times p)}^y = \frac{1}{n}\sum_{j=1}^{J}\sum_{i=1}^{n_j}(F^T x_{ji} - F^T\overline{x}_{j^*})(F^T x_{ji} - F^T\overline{x}_{j^*})^T = F^T S_W F$$

The criterion used to derive the optimal projection matrix is to find F that maximizes the trace of the between-class variance $$S_B^y = tr(F^T S_B F)$$

under a constraint on the within-class variance $$S_W^y = F^T S_W F = I_{p\times p}$$

The trace of a matrix is defined as the sum of all diagonal elements of that matrix.

The solution to this maximization problem is simply a set of generalized eigen vectors, which can be obtained as follows. If we let $$\Theta = S_W^{\frac{1}{2}} F$$

then the original constrained maximization problem is equivalent to maximizing $$tr(\Theta S_W^{-\frac{1}{2}} S_B S_W^{-\frac{1}{2}} \Theta^T)$$

subject to $$\Theta^T \Theta = I_{p\times p}$$

which leads to the solution $$\hat{F} = S_W^{-\frac{1}{2}} \hat{\Theta}$$

where $\hat{\Theta}$ is the matrix of leading p eigenvectors of $$S_W^{-\frac{1}{2}} S_B S_W^{-\frac{1}{2}}$$

Or, equivalently, $\hat{F}$ is the matrix of leading p eigenvectors of $S_W^{-1} S_B$.

APPENDIX B
Penalized Discriminant Analysis

The predictor variables in the color spectrum problem represent different wavelengths and adjacent variables are more alike than the ones far apart. In this case, since adjacent predictor variables are highly correlated, it is desirable to have similar coefficients for neighboring predictor variables. In other words, the coefficients should change smoothly across the predictor variables. Hastie, Buja and Tibshirani (1992) have developed a new method called penalized discriminant analysis ("PDA") that allows a smoothness constraint on the discriminant coefficients, both for improved prediction performance and interpretability. The new method is an extension of the traditional LDA by introducing smoothness to the discriminant coefficients.

The PDA projections are obtained as the F matrix that maximizes the between-class variance $$S_B^y = tr(F S_B F^T)$$

under a constraint on the penalized within-class variance of $$S_W^y(\Omega) = F(S_W + \lambda\Omega) F^T = I_{p\times p}$$

where $\Omega$ is a d×d penalty matrix and $\lambda$ is a scalar that adjusts the degrees of smoothness of the linear discriminant coefficients. As an example, $\Omega$ can be chosen such that $\beta^T \Omega \beta$ represents the "integrated" absolute value of the second order derivatives of the function representing the LDA coefficient $\alpha$, where $\alpha$ can be any one column of F. The goal is to keep this term relatively small if we want the coefficients to be smooth. In the current procedure, the $\Omega$ is chosen to be:

$$\Omega = \begin{cases} 16 & \text{if } |i-j| = 0 \\ -9 & \text{if } |i-j| = 1 \\ 0 & \text{if } |i-j| = 2 \\ 1 & \text{if } |i-j| = 3 \\ 0 & \text{if } |i-j| > 3 \end{cases}$$

which is derived from the second order derivatives of a cubic spline fit to the coefficients.

What is claimed is:

1. A method for optically identifying a product from a reference library of known products based on a reflected spectrum of said product, said method comprising the steps of:

applying a broad wavelength light source to said product;

processing said reflected spectrum to form a plurality of finely spaced wavelengths, said wavelengths being optically processed to generate signals proportional to an amount of light received at each of said wavelengths;

forming a data set relating each of said signals to each of said wavelengths;

constructing said reference library of known products by repeating said steps of applying, processing and forming with different products;

generating a given set of basis functions for all of said different products and a corresponding set of basis coefficients for each of said different products when constructing said reference library;

generating a given set of basis coefficients for said product when utilizing said reference library to identify said product; and classifying said given set of basis coefficients against said reference library to identify said corresponding set of basis coefficients most closely matching said given set of basis coefficients.

2. The method according to claim 1, wherein said given set of basis functions is greater than three.

3. The method according to claim 2, wherein said given set of basis functions is between ten and twenty.

4. The method according to claim 3, wherein said given set of basis functions is sixteen.

5. The method according to claim 1, wherein a number of said plurality of finely spaced wavelengths is greater than three.

6. The method according to claim 1, wherein a spectrum of said broad wavelength light source is from the ultra violet to the near infrared region.

7. The method according to claim 1, wherein said step of generating is implemented using a linear discriminant analysis technique.

8. The method according to claim 7, wherein said step of forming includes the steps of:
    averaging rows of information down to a given number of rows;
    averaging columns of information down to a given number of columns; and
    converting spatial positions of each of said finely spaced wavelengths to a specific wavelength value.

9. The method according to claim 8, wherein said given number of rows is one.

10. The method according to claim 7, wherein said step of classifying is achieved using a non-negative least squares technique.

11. The method according to claim 7, wherein said step of classifying is achieved using a nearest neighbor technique.

12. The method according to claim 10, wherein said given number of basis functions is greater than three.

13. The method according to claim 1, wherein said step of generating is implemented using a penalized discriminant analysis technique.

14. The method according to claim 13, wherein said step of classifying is achieved using a non-negative least squares technique.

15. The method according to claim 13, wherein said step of classifying is achieved using a nearest neighbor technique.

16. The method according to claim 15, wherein said given number of basis functions is greater than three.

17. The method according to claim 1, wherein said step of forming includes the steps of:
    measuring a dark reference;
    measuring a white reference;
    normalizing each of said signals by subtracting said dark reference from said signal to form a first term, subtracting said dark reference from said white reference to form a second term and dividing said first term by said second term; and
    repeating said steps of measuring a black reference, measuring a white reference and normalizing each of said signals as necessitated by the circumstances.

18. The method according to claim 17, wherein:
    said given number of basis functions is greater than three;
    said step of generating is achieved using a penalized discriminant analysis; and
    said step of classifying is implemented using a nearest neighbor technique.

19. The method according to claim 1, wherein said step of classifying includes the steps of:
    generating a ranked order list of product choices;
    displaying said ranked order list on a display interface unit; and
    selecting one of said product choices on said ranked order list.

20. The method according to claim 19, wherein said step of selecting is automatic.

21. The method according to claim 19, wherein said step of selecting is manual.

22. The method according to claim 1, wherein each of said corresponding basis coefficients has an associated category label.

23. The method according to claim 1, further including the steps of:
    compiling another data set which relates said amount of light to a vertical distance along said product length;
    generating a second set of a given number of basis functions and corresponding basis coefficients to form a second reference library;
    comparing a second given number of basis coefficients to said second reference library;
    combining an outcome of said step of comparing with said step of classifying to produce a ranked order list of most closely matched product choices.

24. The method of claim 1, further including the steps of:
    taking an image of said product to generate a profile of said product; and
    statistically combining said profile with said step of classifying to produce a ranked order list of most closely matched product choices.

25. An optical identification system for optically identifying a product at a checkout station against a reference library based on a reflected spectrum of said product, said system comprising:
    a broad wavelength light source for illuminating said product at the checkout station;
    a spectrometer for processing said reflected spectrum to form a plurality of finely spaced wavelengths;
    detecting means for processing each of said wavelengths to generate signals proportional to an amount of light received at each of said wavelengths;
    a processor operable to form a data set relating each of said signals to each of said wavelengths;
    said processor being further operable to construct said reference library by making measurements on different products and storing said data set from each of said measurements;
    said processor being further operable to generate a given set of basis functions for all of said different products and a corresponding set of basis coefficients for each of said different products when constructing said reference library;
    said processor being further operable to generate a given set of basis coefficients for said product when utilizing said reference library to identify said products; and
    said processor being further operable to classify said given set of basis coefficients against said reference library to identify said corresponding set of basis coefficients most closely matching said given set of basis coefficients.

26. The system according to claim 25, wherein said given set of basis functions is greater than three.

27. The system according to claim 25, wherein:

said processor utilizes a linear discriminant analysis to produce said given number of basis functions, said corresponding number of basis coefficients and said given number of basis coefficients; and said processor utilizes a nearest neighbor analysis to classify said product.

28. The system according to claim 25, wherein:

said processor utilizes a penalized discriminant analysis to produce said given number of basis functions, said corresponding number of basis coefficients and said given number of basis coefficients; and said processor utilizes a non-negative least squares analysis to classify said product.

29. The system according to claim 25, wherein said processor is further operable to normalize said signals by adjusting said signals with respect to a dark reference measurement and a white reference measurement.

30. The system according to claim 25, further including a display for displaying a ranked order of product choices and said display having means for selecting one of said product choices.

* * * * *